(12) United States Patent
Stacey (10) Patent No.: US 7,907,611 B2
(45) Date of Patent: Mar. 15, 2011

(54) PAYLOAD HEADER SUPPRESSION WITH CONDITIONAL FIELD SUPPRESSION

(75) Inventor: Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 12/254,001

(22) Filed: Oct. 19, 2008

(65) Prior Publication Data

US 2010/0098080 A1    Apr. 22, 2010

(51) Int. Cl.
*H04L 12/56* (2006.01)
*H04J 3/24* (2006.01)
*G06F 15/16* (2006.01)

(52) U.S. Cl. ......... 370/389; 370/474; 370/477; 709/247
(58) Field of Classification Search .................. None
See application file for complete search history.

(56) References Cited

U.S. PATENT DOCUMENTS

| 7,327,726 | B2* | 2/2008 | Kye ............................. 370/389 |
| 7,386,013 | B1* | 6/2008 | Beser ........................... 370/477 |
| 7,400,613 | B2* | 7/2008 | Sala et al. .................... 370/341 |
| 7,688,781 | B2* | 3/2010 | Sala et al. .................... 370/328 |
| 2002/0191691 | A1* | 12/2002 | Holborow ..................... 375/240 |
| 2006/0262788 | A1* | 11/2006 | Johnson et al. ............... 370/389 |
| 2007/0206594 | A1* | 9/2007 | Johnson et al. ............... 370/389 |
| 2007/0211719 | A1* | 9/2007 | Johnson et al. ............... 370/389 |
| 2009/0190612 | A1* | 7/2009 | Bae et al. ..................... 370/477 |

* cited by examiner

*Primary Examiner* — Gregory B Sefcheck
(74) *Attorney, Agent, or Firm* — Cool Patent, P.C.; Kenneth J. Cool (57) ABSTRACT

A conditional payload header suppression is disclosed to improve compression, by providing the flexibility to dynamically introduce fields/header bytes, which change temporarily or infrequently in packets. The embodiment also uses a dynamic mask as part of the payload header suppression packet to indicate which of the conditionally suppressed header bytes are present in the packet sent over the air or the communication medium. An embodiment of this invention increases the header compression for packets such as IP/UDP/RTP (VOIP) and TCP ACK in communication networks, such as WiMax.

30 Claims, 6 Drawing Sheets

PRIOR ART

PAYLOAD HEADER SUPPRESSION WITH CONDITIONAL FIELD SUPPRESSION

BACKGROUND OF THE INVENTION

Payload Header Suppression (PHS) protocol has been used in communication systems, such as WiMax (IEEE 802.16 specification), to effectively compress packet headers, such as IP/UDP/RTP header in a typical voice over IP call or IP/TCP header of ACK frames. In the case of IP/UDP/RTP header, the suppression typically reduces the packet header from about 40 bytes to 14 bytes (i.e., 62.5%). With PHS, the portion of the payload header repeated in all packets in a session is suppressed (masked) by the sending entity and restored by the receiving entity.

However, PHS, as currently used, is an all-or-nothing technique for suppressing header fields. If a field that is being suppressed changes, then the entire payload header must be restored, unless another PHS session in effect already captures that specific change. If the change persists through subsequent packets, it is possible to establish a new session updating the cache to reflect the new field value, and thus, reestablishing the compression.

However, reverting from a compressed header to an uncompressed header can have a significant impact on jitter and delay with applications, such as Voice-Over-IP (VoIP) sessions in the uplink under Extended Real-Time Polling Service (eRTPS). Since header suppression significantly reduces the bandwidth requirement, reverting to uncompressed headers significantly increases the packet size, and thus, the bandwidth requirement may demand a new bandwidth. Therefore, with current PHS, there exists a strong incentive not to suppress header fields that may have even a small chance of changing during the session.

Other header compression schemes, e.g., Van Jacobson (RFC 1144) and ROHC (RFC 3095), may not be suitable in all applications as they are delta-based, i.e. they code the differences between subsequent packets.

The embodiments of the current invention improve the compression ratio by the conditional suppression of infrequently changing header fields, which increases the robustness of existing PHS.

DETAILED DESCRIPTION OF THE PREFERRED EMBODIMENTS

With PHS, the repetitive portion of the payload header is suppressed by the sending entity and restored by the receiving entity. Each media access layer (MAC) service data unit (SDU) that is classified by the sender to belong to that flow has the repetitive portion of the payload header removed and prefixes the SDU with a payload header suppression index (PHSI), identifying the SDU as belonging to that flow (i.e., PHS session). The receiver uses the PHSI to identify the session to which the SDU belongs, looks up the cached fields and restores those fields to the SDU before passing the SDU to the higher layers.

Figure 1:
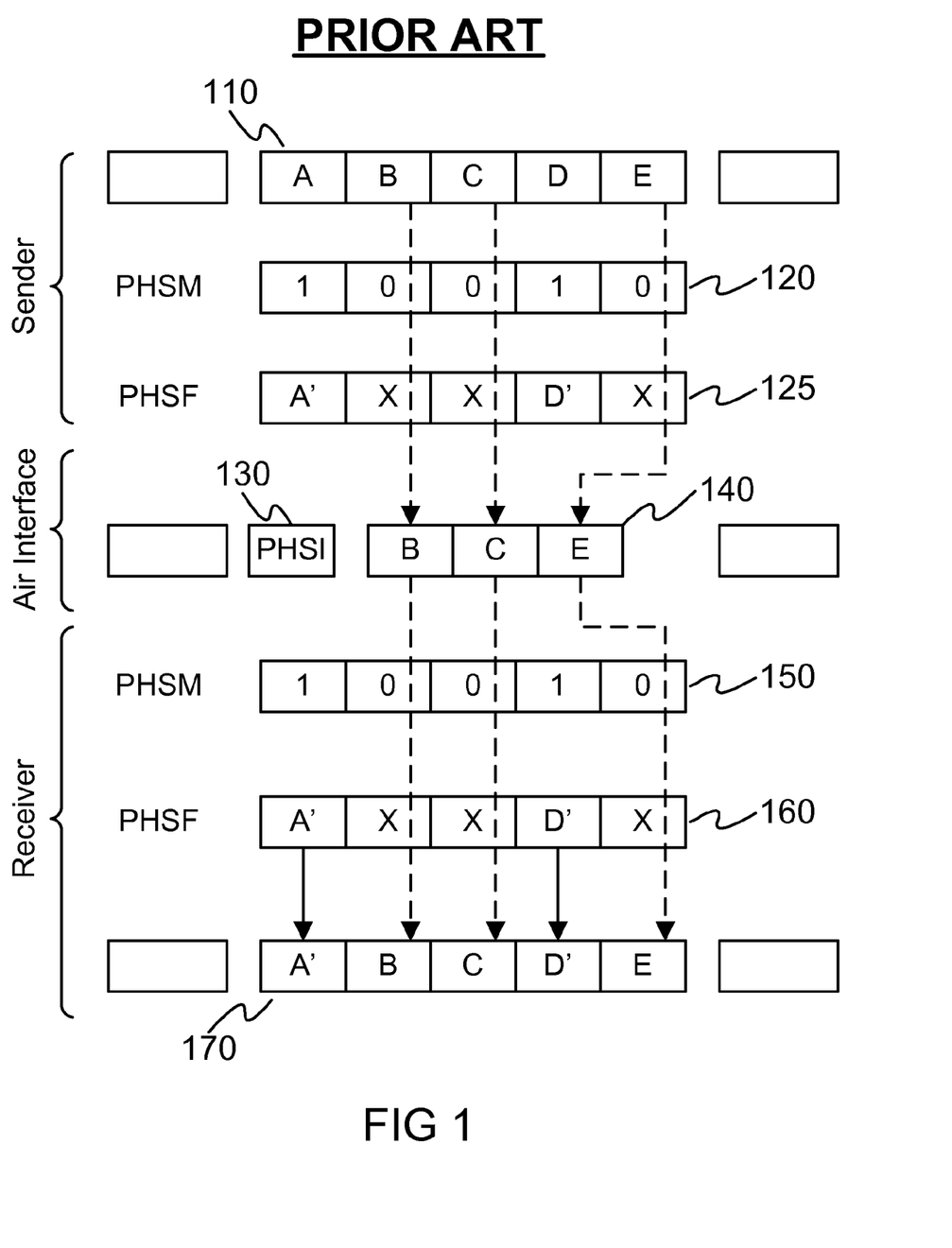
FIG. 1 depicts PHS as currently defined in prior art.

FIG. 1 illustrates the PHS operation as currently used. Suppose the current header (110) consists of bytes A through E. Payload header suppression mask (PHSM) (120) is defined which specifies which of the header bytes should be suppressed for a particular session identified by PHSI (130). The unsuppressed header bytes (B, C, and E) are sent (140) over the air or the communication medium, for the bytes not masked by PHSM, e.g., where PHSM (120) is 0 for the corresponding byte in the header (110). The repetitive portion of the cached payload header suppression fields (PHSF) (e.g., A' and D') (125) are suppressed, e.g., where PHSM (120) is 1 for the corresponding byte in the header (110). At the receiver, the mask PHSM (150) and cached header fields PHSF (160) are used to recreate the header (170). Note that the notation "X" in FIG. 1 indicates "Do not care" state which means the corresponding value could be anything.

An embodiment of this invention uses a conditional mask (PHSC) to improve compression by providing the flexibility to dynamically introduce fields which change temporarily or infrequently. The embodiment also uses a dynamic mask (PHSD) as part of the PHS packet to indicate which of the conditionally suppressed header bytes are present in the packet sent over the air. The embodiment still uses PHSM to unconditionally suppress the corresponding header bytes.

Figure 2:
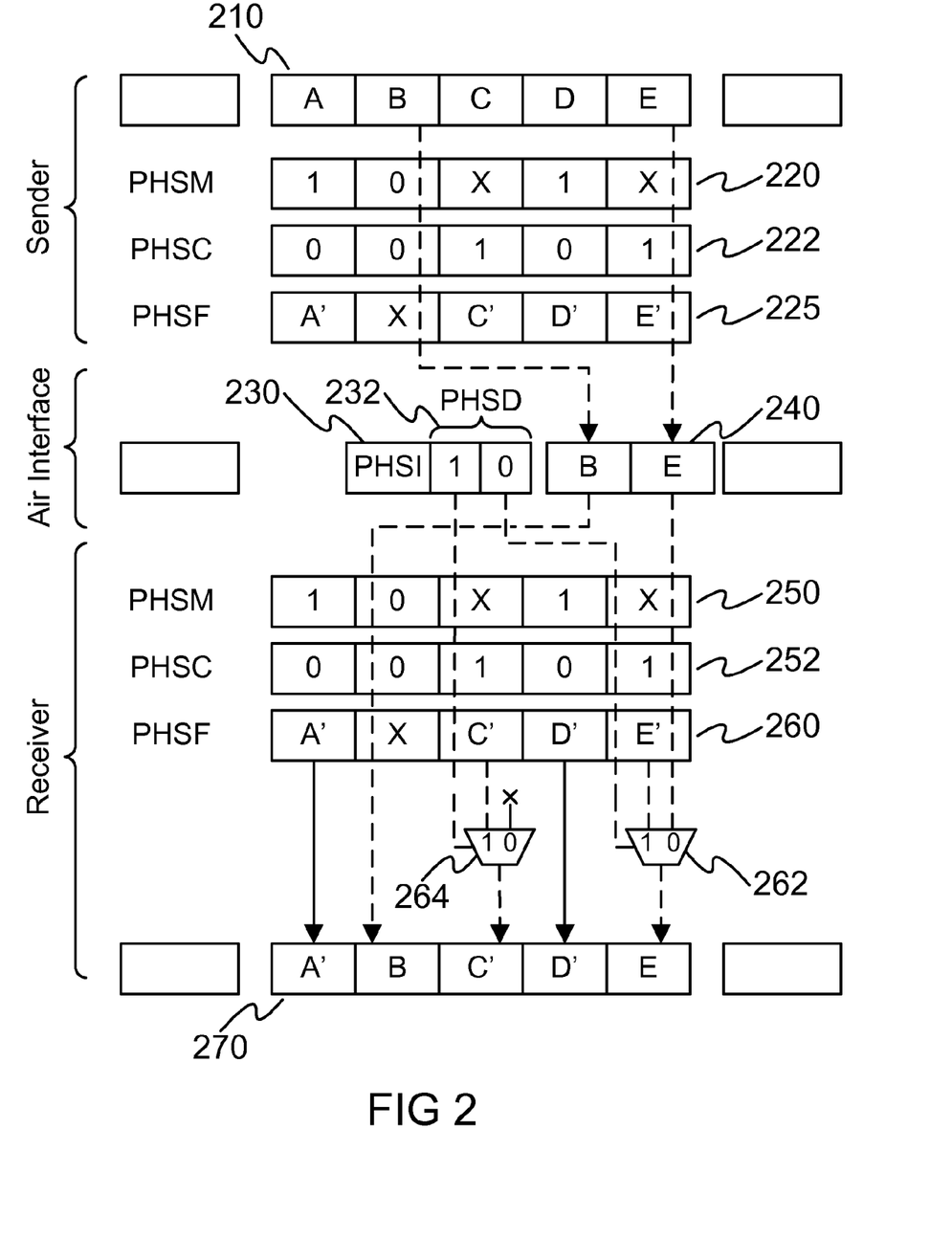
FIG. 2 depicts PHS enhanced with dynamic and conditional masks in an embodiment of this invention.

FIG. 2 illustrates an example of this embodiment. The conditional mask PHSC is added at the sender and receiver (222 and 252, respectively) to indicate which of the header bytes (210) are conditionally suppressed. For example, a value of 1 in PHSC at the corresponding position indicates that that header byte (210) is compared to the cached value (225), and if they are different, it is included in the header payload (240) sent over the air or the communication medium. Suppose the header (210) comprises bytes A through E. The conditional mask PHSC (222) indicates that the header bytes C and E are compared with their corresponding cached values (C' and E', respectively) (225). Header byte C matches its cached value (e.g., when C=C'), and it is suppressed from the header sent (240) over the air. The corresponding bit in PHSD (232) is set to indicate this field is conditionally masked in the header sent. The header (210) byte E does not match its cached value (225) (e.g., when E≠E'), and it is included in the header sent (240) over the air or the communication medium. The corresponding bit in PHSD (232) is cleared to indicate this file was not conditionally masked in the header sent. The header (210) byte B, which is not conditionally masked by either PHSC or PHSM, is sent (240) over the air or the communication medium.

On receiving the packet, the value (e.g., a bit having a value of 1) in PHSC (252) corresponding to byte position C indicates a conditionally suppressed byte, while the associated bit in PHSD (e.g., 1) indicates that the byte was conditionally suppressed. Therefore, the embodiment restores (264) the byte in position C (270) from the cache (260). On the other hand, the embodiment retains the value of E from the header (240) sent over the air because the bit in PHSC (252) corresponding to that position indicates a conditionally suppressed byte and the associated bit in PHSD (232) indicates that that byte was not suppressed. The embodiment also retains the value of byte B sent through the air as this field is not suppressed by either PHSM and PHSC Note that the notation "X" in FIG. 2 indicates "Do not care" state which means the corresponding value could be anything.

PHS Header

Figure 3A:
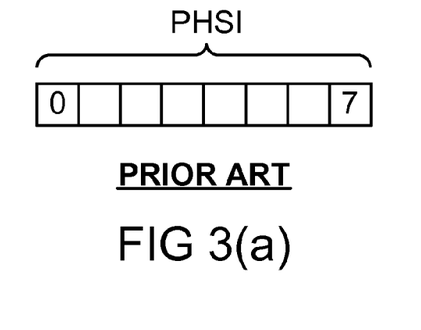
FIG. 3(a) depicts the current (prior art) PHSI header 8 bits; (b) depicts using 3 bits for PHSD from original 8 bits of PHSI; (c) depicts using 4 bits for PHSD from original 8 bits of PHSI; (d) depicts addition of one byte after PHSI for PHSD; and (e) depicts a combination of using 2 bits of the original PHSI and addition of one byte for PHSD.

The current PHS header consists of a single byte carrying the PHSI. The current 8-bit PHSI (see FIG. 3(a)) can thus uniquely identify 256 PHS sessions per CID.

To maintain good overall compression, the additional overhead associated with PHS should be kept low. For example, an embodiment with a minimum sized dynamic mask (PHSD) of 3-bits is effective with both VoIP and TCP traffic.

Figure 3B:
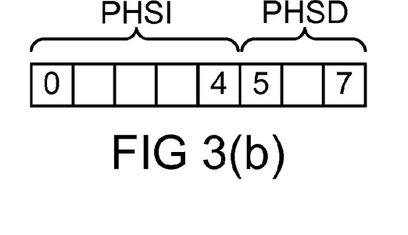

In an embodiment of this invention, one or more bits from existing PHSI is used for PHSD, with the remaining bits in PHSI used to identify PHS sessions per CID. The following examples keep PHS overhead low while maintaining flexibility in the protocol:

Reduce the PHSI to 5 bits (32 PHS sessions per CID) and use the remaining 3 bits in the header byte to carry the PHSD (FIG. 3(b)).

Figure 3C:
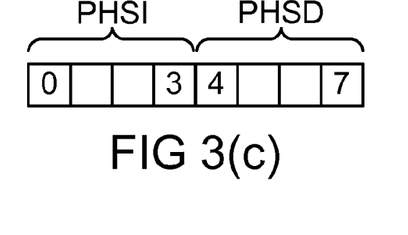

Reduce the PHSI to 4 bits (16 PHS sessions per CID) and use the remaining 4 bits in the header byte to carry the PHSD (FIG. 3(c)).

Figure 3D:
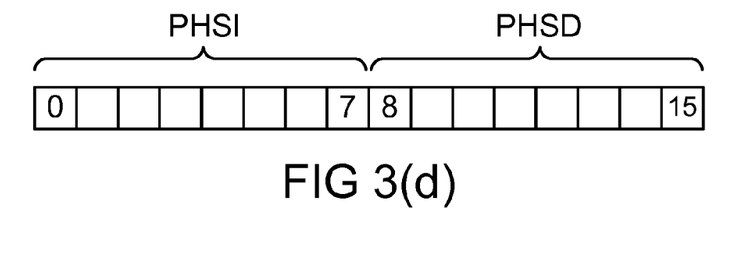

In an embodiment of this invention, one or more additional bytes are added after PHSI for PHSD, e.g., by keeping the PHSI at 8 bits and including an additional byte to carry the PHSD increasing the PHS header size to 16 bits (FIG. 3(d)).

Figure 3E:
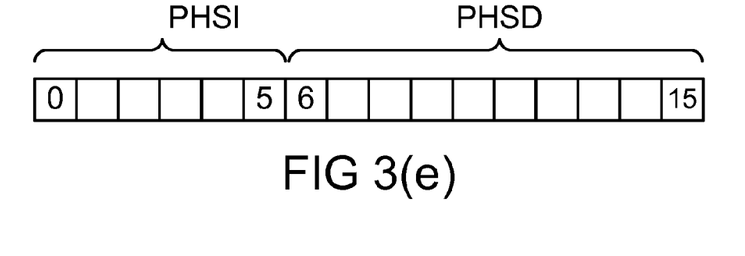

In an embodiment of this invention, more than one of the above options is used in combination (e.g., FIG. 3(e) showing a combination of using 2 bits of the original PHSI and addition of one byte for PHSD).

In one embodiment of this invention, a particular option in effect is signaled or negotiated as part of the PHS session establishment. Any of these and other options are also considered as part of this invention.

PHS Signaling

A PHS session is established with a three way handshake, for example, between a Base Station (BS) and a Subscriber Station (SS). The BS (or SS) sends a Dynamic Service Change Request (DSC-REQ) to which the SS (or BS) responds with Dynamic Service Change Response (DSC-RSP) to which the BS (or SS) responds with a Dynamic Service Change Acknowledgement (DSC-ACK). These messages include information elements for, among other things, defining the PHSF and PHSM. The Type-Length-Value (TLV) element for defining the current PHSM is given in Table 1.

TABLE 1

Current PHSM TLV

| Type | Length | Value | |
|---|---|---|---|
| [145/146].cst.6.3 | n | bit 0: | 0 = don't suppress first byte of the suppression field. |
| | | | 1 = suppress first byte of the suppression field. |
| | | bit 1: | ... |
| | | bit x: | 0 = don't suppress (x + 1) byte of the suppression field. |
| | | | 1 = suppress (x + 1) byte of the suppression field. |

In one embodiment of this invention, the PHS session establishment is enhanced to support the conditional suppression by defining a new TLV to carry the PHSC. An example of such TLV element is given in Table 2.

TABLE 2

An example of PHSC TLV

| Type | Length | Value | |
|---|---|---|---|
| Set for example by a working group or a standard body. | n | bit 0: | 0 = don't conditionally suppress first byte of the suppression field. |
| | | | 1 = conditionally suppress first byte of the suppression field. |
| | | bit 1: | ... |
| | | bit x: | 0 = don't conditionally suppress (x + 1) byte of the suppression field. |
| | | | 1 = conditionally suppress (x + 1) byte of the suppression field. |

In one embodiment, if the PHSC TLV is not present in the handshake/session establishment, the default behavior is to effectively revert to the original PHS behavior, and not conditionally suppress any bytes.

EXAMPLE

Conditional Suppression of IP/UDP/RTP Header in VOIP

Figure 4:
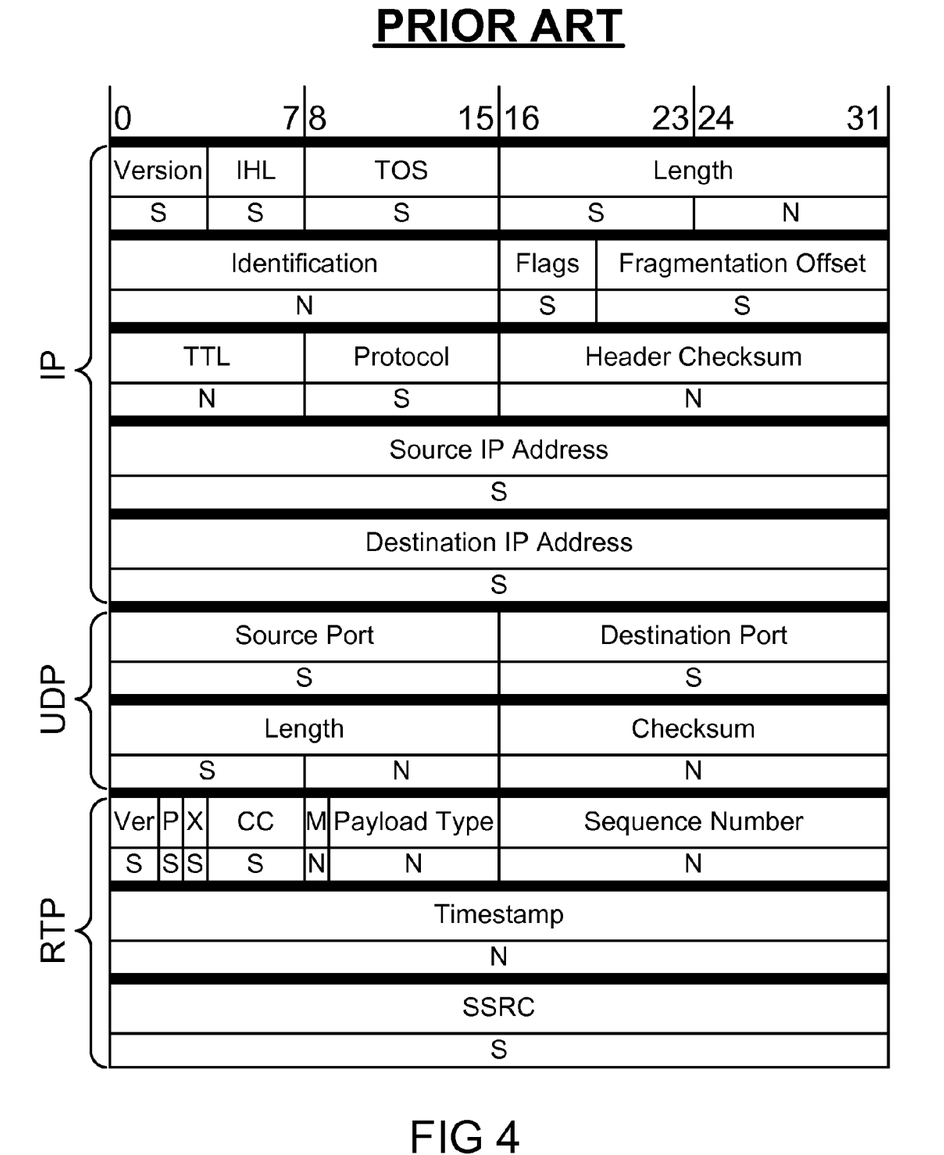
FIG. 4 depicts fields/bytes typically (in prior art) suppressed in the IP/UDP/RTP VoIP header.

FIG. 4 shows the fields in IP/UDP/RTP VoIP header that are currently/typically suppressed by PHS. In FIG. 4, indicator "S" under a field (or a portion of the field) indicates that the field (or that portion of the field) is suppressed in the payload header, and indicator "N" under a field (or a portion of the field) indicates that the field (or that portion of the field) is not suppressed and sent in the payload over the air or the communication medium. The current approach for handling fields which change infrequently or temporarily is to not include them in the mask (PHSM) since the penalty for any change occurring in those fields is to restore the entire header.

In one embodiment of this invention, the fields that are changed infrequently or temporarily are included in the conditional mask, PHSC. For example, one embodiment of this invention includes the fields identified by indicator "C" in FIG. 5 as part of PHSC for IP/UDP/RTP VOIP header. (Note that indicators "S" and "N" identify the fields that are suppressed via PHSM and not suppressed at all, respectively).

Figure 5:
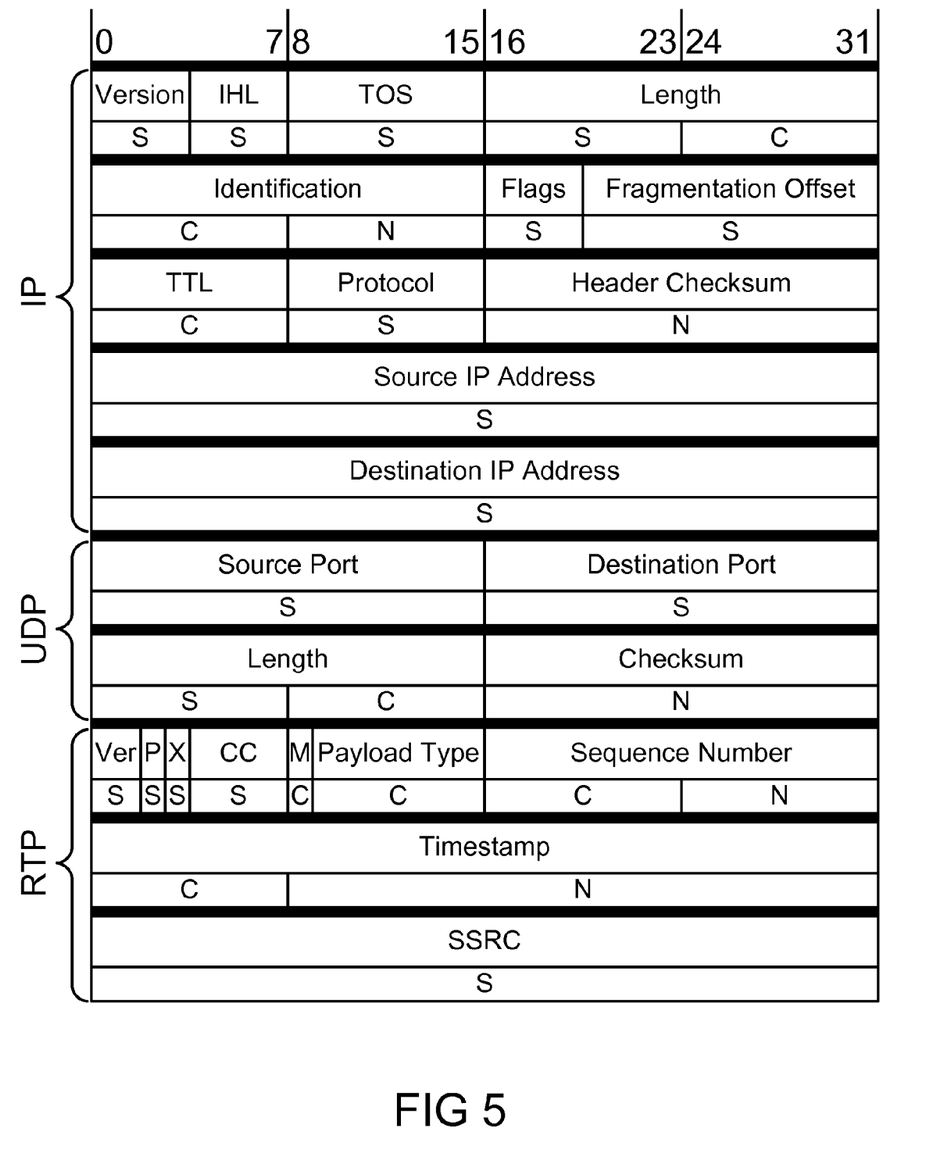
FIG. 5 depicts fields/bytes suppressed, conditionally suppressed, and not suppressed in the IP/UDP/RTP VoIP header in an embodiment of this invention.

As indicated in FIG. 5, the examples of fields changing infrequently include:

The Time-to-Live (TTL) field in the IP header: This is typically constant in the uplink but can change in the downlink. While the TTL rarely changes, it is possible that during a VoIP session the packets are temporarily rerouted in the network, increasing or decreasing the number of nodes the packets traverse.

The Length field in the UDP header: In the case of Adaptive Multi-Rate (AMR) encoding, the length field is constant for data packets but changes during silence periods when the shorter silence descriptor (SID) packet is sent.

The Marker bit in the RTP header: This bit changes infrequently, for example at the end of a silence period. However, the fact that it changes at all means that the byte containing this field can not be unconditionally suppressed by PHSM.

EXAMPLE

Conditional Suppression of TCP ACK Header

With web browsing, TCP traffic in the uplink is quite light and mostly consist of short packets with HTTP requests and TCP ACK for downlink data. Since most of the packets are TCP ACK, a good compression is currently achieved by caching everything except the sequence number and flags fields.

In one embodiment of this invention, one or more fields in TCP ACK header that are changed infrequently or temporarily are included in the conditional mask, PHSC. The examples of such fields include:
- Flags. Since most packets are TCP ACKs, the flags field usually has just the ACK bit set.
- High order sequence number bytes. The high order sequence number bytes typically do not change. However, if the session lasts long enough the sequence number may roll over into the high order bytes.
- The IP length field rarely changes if TCP ACKs are primarily being sent.

In one embodiment, the flags field of TCP header, one or more high order byte(s) of TCP acknowledgement number, one or more the high order byte(s) of TCP sequence number, and IP length field are conditionally suppressed.

Example of Compression Ratios Under Conditional Header Suppression

An embodiment of this invention is used in applications such as VOIP or multimedia streaming in communication systems/networks such as WiMAX or other wireless communication systems. An embodiment of this invention uses the conditional header suppression in addition to the existing PHS for performance improvement in header compression, e.g., in VoIP.

In an embodiment of this invention, the header compression for IP/UDP/RTP (e.g., in VoIP) packet increases from 57.5% (i.e., compressing a 40 byte header to 16 bytes+1 byte PHS header) under the existing PHS (illustrated in FIG. 4). In one embodiment, the TTL, low order IP length, low order UDP length and the byte containing RTP M-bit are conditionally/dynamically suppressed, and the compression is improved to 67.5% (i.e., compressing a 40 byte header to 12 bytes+1 byte PHS header).

In one embodiment, further compression is achieved (e.g., when more frequent PHS signaling is tolerated) by including one or more of high order byte(s) of multi-byte fields in the PHSC. The example of such fields include 4-bytes timestamp field in RTP header, the 2-bytes identification field in the IP header (often an incrementing sequence), and the 2-bytes sequence number field in the RTP header (often an incrementing sequence).

In one embodiment, additionally, the higher order byte of the IP identification field, the high order byte of the RTP sequence number, and the high order byte of the RTP timestamp field fields are conditionally suppressed, and not sent over the air or the communication medium (e.g., see FIG. 5). In this embodiment, the header compression ratio increases up to 72.5% (40 byte header compressed to 9 bytes+2 byte PHS header).

In one embodiment (e.g., when more frequent PHS signaling is tolerated), when a high order byte of conditionally suppressed field changes, the field would be included in over the air transfer, and a new PHS session is established to suppress the new changed value.

In one embodiment of this invention, a base station and/or a mobile station device in wireless network(s) (such as WiMAX network, a Wi-Fi network, a digital packet network, a 2G network, a 2.5G network, a 3G network, evolved universal terrestrial radio access network (E-UTRAN), a 3GPP network, or a 3GPP2 network) send and/or receive conditionally suppressed payload headers.

One embodiment of this invention uses conditionally suppressed payload headers without unconditional suppression (i.e., without PHSM). In this embodiment, the header bytes that are not conditionally suppressed are sent over the air, as if PHSM does not indicate any bytes to mask unconditionally.

This invention is also applicable to any payload (other than the header fields). An embodiment of this invention maps PHSD bits to the bytes within the payload.

In an embodiment of this invention, various metrics for transmission of conditionally masked header fields are tracked and collected during the PHS session, such as:
- The count of changed values in a particular conditionally masked header field since the session started.
- The count of the packets transmitted having a changed value in the particular conditionally masked header field.
- The count of most recent consecutive packets transmitted having the same changed value in the particular conditionally masked header field.
- The count of most recent consecutive packets transmitted having any changed value in a particular conditionally masked header field.
- The count of most recent packets transmitted with the same changed values in a set of conditionally masked header fields.

Based on one or more of such metrics, associated configurable threshold values, and protocol dependent rules, an embodiment of this invention renegotiates the PHS session by establishing a modified set of cached values between the sender and the receiver. This improves the subsequent header suppressions when many conditionally suppressed header fields have already changed and they have stayed the same for many consecutive packets to justify adopting new set of cashed field values. The examples of threshold values include, the combination and/or the number of bytes/fields that have changed, and the number of consecutive packets transmitted having the same changed set of conditionally masked header field values. In some cases, such as changed high order byte of a sequence header field, the changes occur after the transmission of certain number of packets, causing the high order byte, for example, to increment. In one embodiment, a protocol dependent rules prevent the renegotiation for a new set of cached values temporarily, if the value of such high-order byte field is about to change (e.g., based on the low-order byte or the number of packets already transmitted using the current changed field values).

Examples of PHSD Mapping to Conditionally Masked Payload Header Fields/Bytes

Some embodiments of the invention illustrated the payload header suppression by using a bit in PHSD to correspond to a byte in a header field (e.g., FIG. 6(*a*)); however, this is done for the illustration purposes as this invention covers all variations in mapping.

An embodiment of this invention uses a bit in PHSD to correspond to a range of bytes in the payload header (e.g., FIG. 6(*b*)). For example, multiple bytes in a header field can be represented by one bit in PHSD. All or portion of one field and all or portion of another header field can be represented by a bit in PHSD (e.g., the byte containing M flag and high order byte of sequence number in RTP header. See FIG. 5.).

An embodiment of this invention (e.g., FIG. 6(*c*)), uses a bit in PHSD to correspond to multiple ranges of byte(s) in the payload header (e.g., the low order byte of length field of IP header and low order byte of length field of UDP header). This allows for more efficient compression when changes in the values of these header bytes are somewhat correlated, by reducing the need to add extra byte(s) to support PHSD. In an example of this embodiment, the order of the header bytes sent over the air is primarily based on to the order of the bits in PHSD and secondarily based on the order of header bytes covered within the PHSD bit's corresponding multiple ranges of byte(s). For example, when a PHSC bit corresponds to the low order byte of length field of IP header and low order byte of length field of UDP header, and one (or both) of these fields is temporarily changed causing PHSD bit to clear, both header bytes will appear is order within the bytes sent over the air.

Figure 6A:
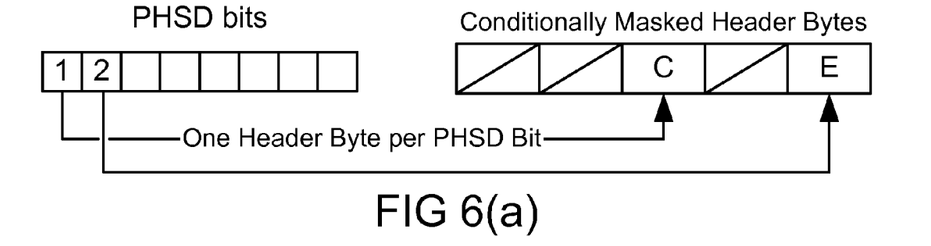
FIG. 6(a) through 6(d) depict various examples of PHSD mapping to conditionally masked header bytes, used in some embodiments of this invention.
Figure 6B:
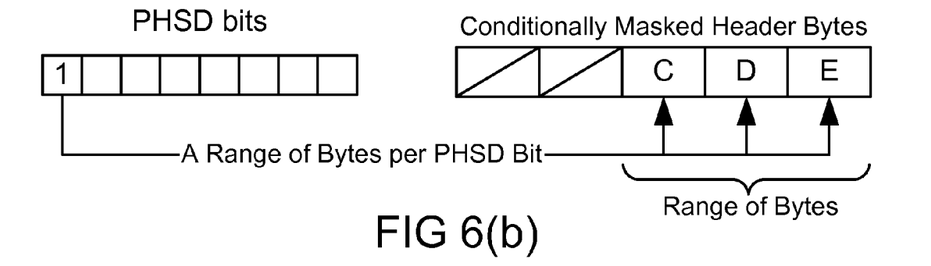
Figure 6C:
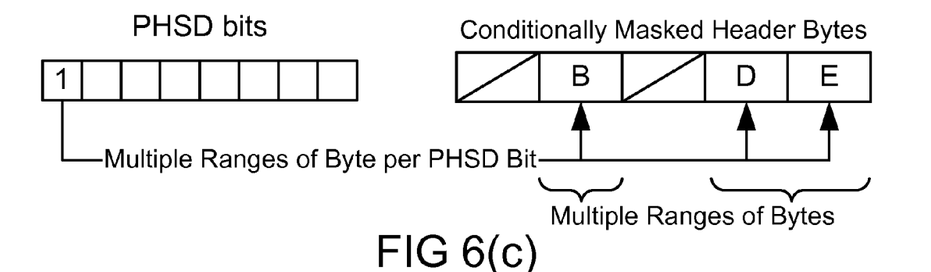
Figure 6D:
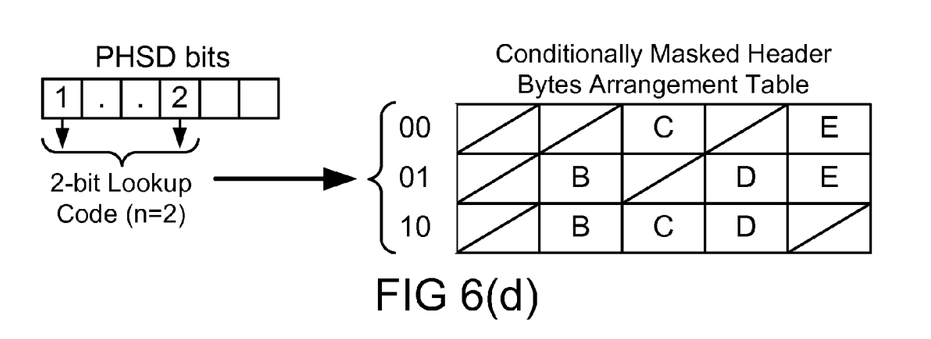

An embodiment of this invention uses one or more bits of PHSD as lookup code into a table for a set of byte arrangements (including multiple byte ranges) in the payload header (e.g., FIG. 6(d)). One embodiment of this invention uses heuristics and/or optimization techniques to construct or pre-configure the header bytes arrangements in the lookup table. For example, n bits of PHSD can indicate up to $2^n$ combinations, and each combination may point to any combination of bytes in the payload header. When these PHSD bits (lookup code) point to a specific header byte arrangement, those header bytes will be sent over the air (i.e., the lookup code indicates that one or more of those header bytes in the arrangement was temporarily changed in the current header packet). In one embodiment, one of these combinations (e.g., all the "1" bits) is used to signal that those n PHSD bits should be skipped for the proposes of sending header bytes over the air (i.e., this has the similar effect as setting PHSD mask bits in an embodiment of FIG. 6(a) to indicate header bytes are conditionally masked in the payload sent over the air). Using FIG. 6(d) as an example, the indicated 2 bits in PHSD provide 4 combinations. The bit combinations {00, 01, 10} in PHSD indicate the header bytes {(C, E), (B, D, E), (B, C, D)} are being sent over the air (i.e., not currently masked), respectively; while for bit combination 11, the embodiment skips those PHSD bits. One embodiment of this invention determines the header bytes sent over the air (i.e. not masked) based on the mapping between the PHSD and the payload header bytes. This embodiment uses the cache values (PHSF) for those bytes not sent over the air to recreate the current header bytes at the receiver.

Any variations of the above teachings are also intended to be covered by this patent application.

The invention claimed is:

1. A method for conditionally suppressing a payload header, said method comprising:
   determining one or more conditionally masked header portions based on a conditional suppression mask and said payload header, wherein the conditionally masked header portions include fields that may change temporarily or infrequently;
   determining changed and unchanged header portions based on said one or more conditionally masked header portions and cached header field values;
   setting a first portion of a dynamic suppression mask corresponding to said changed header portions, to a first code to indicate that said changed header portions and unchanged header portions that include the fields that may change temporarily and infrequently will not be suppressed;
   setting a second portion of said dynamic suppression mask corresponding to said unchanged header portions, to a second code to indicate that said unchanged header portions will be suppressed; and
   sending said dynamic suppression mask and said changed header portions in a packet via a communication medium.

2. A method as recited in claim 1, further comprising:
   determining one or more unconditionally masked header portions based on an unconditional suppression mask and said payload header;
   determining unmasked header portions based on said conditional suppression mask, said unconditional suppression mask, and said payload header;
   if all said one or more unconditionally masked header portions have same corresponding values in said cached header field values, then preventing transmission of said one or more unconditionally masked header portions in said packet, and sending said unmasked header portions in said packet.

3. A method as recited in claim 2, further comprising:
   if any of said one or more unconditionally masked header portions has different corresponding value in said cached header field values, then establishing and renegotiating a new session by capturing said one or more unconditionally masked header portions in new cached header field values of said new session.

4. A method as recited in claim 1, wherein all bits in said dynamic suppression mask and a payload header suppression index exactly fit in one or more whole bytes, in said packet.

5. A method as recited in claim 4, wherein all bits in said dynamic suppression mask and said payload header suppression index exactly fit in one byte, in said packet.

6. A method as recited in claim 4, wherein said dynamic suppression ask and said payload header suppression index are each one byte, in said packet.

7. A method as recited in claim 1, wherein a bit in said dynamic suppression mask corresponds to a byte in said one or more conditionally masked header portions.

8. A method as recited in claim 1, wherein a bit in said dynamic suppression mask corresponds to one or more ranges of one or more consecutive bytes in said one or more conditionally masked header portions.

9. A method as recited in claim 1, wherein said first code is a lookup code in a table of conditionally masked header bytes arrangement; and
   a conditionally masked header bytes arrangement identified by said lookup code in said table corresponds to said changed header portions within said payload header.

10. A method as recited in claim 1, wherein said communication medium is a part of a radio network.

11. A method as recited in claim 10, wherein said communication medium is supported by a WiMAX network, a Wi-Fi network, a digital packet network, a 2G network, a 2.5G network, a 3G network, an E-UTRAN, a 3GPP network, or a 3GPP2 network.

12. A method as recited in claim 1, wherein said payload header is processed in a data link layer.

13. A method as recited in claim 1, further comprising:
   a sender and a receiver establishing a session; and
   negotiating or establishing said conditional suppression mask for said session.

14. A method as recited in claim 13, further comprising said sender and said receiver establishing said cached header field values for said session.

15. A method as recited in claim 1, wherein said payload header is a type of voice-over-internet-protocol header or a type of TCP-ACK header.

16. A method for re-constructing a payload header, said method comprising:

receiving a dynamic suppression mask in a packet via a communication medium;

determining changed header portions from said packet based on a first portion of said dynamic suppression mask with a value of a first code that indicates the changed header portions have not been suppressed;

determining unchanged header portions from cached header field values based on a second portion of said dynamic suppression mask with a value of a second code that indicates the unchanged header portions have been suppressed;

determining conditionally unmasked header portions based on a conditional suppression mask and said cached header field values, wherein the conditionally unmasked header portions include fields that may change temporarily or infrequently but that are not suppressed; and constructing said payload header based on said changed header portions, said unchanged header portions, and said conditionally unmasked header portions.

17. A method as recited in claim 16, wherein all bits in said dynamic suppression mask and a payload header suppression index exactly fit in one or more whole bytes, in said packet.

18. A method as recited in claim 17, wherein all bits in said dynamic suppression mask and said payload header suppression index exactly fit in one byte, in said packet.

19. A method as recited in claim 17, wherein said dynamic suppression mask and said payload header suppression index are each one byte, in said packet.

20. A method as recited in claim 16, wherein said communication medium is a part of a radio network.

21. A method as recited in claim 20, wherein said communication medium is supported by a WiMAX network, a Wi-Fi network, a digital packet network, a 2G network, a 2.5G network, a 3G network, an E-UTRAN, a 3GPP network, or a 3GPP2 network.

22. A method as recited in claim 16, wherein said payload header is processed in a data link layer.

23. A method as recited in claim 16, further comprising:
a sender and a receiver establishing a session; and
negotiating or establishing said conditional suppression mask for said session.

24. A method as recited in claim 23, further comprising said sender and said receiver establishing said cached header field values for said session.

25. A method as recited in claim 16, wherein said payload header is a type of voice-over-internet-protocol header or a type of TCP-ACK header.

26. A method for conditionally suppressing a payload header, said method comprising:

determining one or more conditionally masked header portions based on a conditional suppression mask and said payload header, wherein the conditionally masked header portions include fields that may change temporarily or infrequently;

determining changed and unchanged header portions based on said one or more conditionally masked header portions and cached header field values;

determining whether to reestablish or to reuse said cached header field values;

if said cached header field values are determined to be reused, then setting a dynamic suppression mask based on said changed header portions and said unchanged header portions to suppress said unchanged header portions and not suppress said changed header portions and further not suppress the unchanged header portions that include headers that may change temporarily or infrequently, and sending said dynamic suppression mask and said changed header portions in a packet via a communication medium; and if said cached header field values are determined to be reestablished, then updating said cached header field values based on said changed header portions.

27. A method as recited in claim 26, wherein said communication medium is a part of a radio network.

28. A method as recited in claim 26, wherein all bits in said dynamic suppression mask and a payload header suppression index exactly fit in one or more whole bytes, in said packet.

29. A method as recited in claim 26, wherein a bit in said dynamic suppression mask corresponds to a byte in said one or more conditionally masked header portions.

30. A method as recited in claim 26, wherein said payload header is processed in a data link layer.

* * * * *